United States Patent

Terasaki et al.

Patent Number: 5,325,468
Date of Patent: Jun. 28, 1994

[54] OPERATION PLANNING SYSTEM FOR ROBOT

[75] Inventors: Hajime Terasaki; Hironobu Takahashi, both of Tsukuba, Japan

[73] Assignee: Sanyo Electric Co., Ltd., Osaka, Japan

[21] Appl. No.: 784,153

[22] Filed: Oct. 28, 1991

[30] Foreign Application Priority Data

Oct. 31, 1990 [JP] Japan .................................. 2-295028
Oct. 31, 1990 [JP] Japan .................................. 2-295029
Oct. 9, 1991 [JP] Japan .................................. 3-261981

[51] Int. Cl.⁵ .......................................... B25J 19/00
[52] U.S. Cl. ............................................... 395/97
[58] Field of Search ........................................ 395/97

[56] References Cited

U.S. PATENT DOCUMENTS 4,967,125 10/1990 Hara ................................. 395/97
5,157,315 10/1992 Miyake et al. ..................... 395/97

OTHER PUBLICATIONS

"Automatic Grasping: A Case Study In Accessibility Analysis"; by Lavgier et al.; Elsevier Sci Pub. B.V.; 1984; pp. 201–214.

Primary Examiner—Allen R. MacDonald
Attorney, Agent, or Firm—Spensley Horn Jubas & Lubitz

[57] ABSTRACT

Pick-and-place grasp candidates for positions at which an object can be picked and placed on a table are calculated based on the initial and goal states of the object, the surrounding environment state at the initial and goal states and the geometrical data of a robot hand. A space characterization is prepared which represents various states relating to the object around the grasp position in each of the calculated pick-and-place grasp candidates. The magnitude of the space in which the hand can be moved is estimated from the prepared space characterizations. Based on the results, position and orientation for pick-and-place grasp is selected from the pick-and-place grasp candidates. If the object cannot be moved from its initial state to its goal state through one grasp and movement action, the object is once returned onto the table and regrasped by the robot hand. Regrasp orientation of the object the is selected from stable orientations which depend on the geometric data of objects to be handled. In such a manner, a robot operation plan can be prepared automatically.

6 Claims, 23 Drawing Sheets

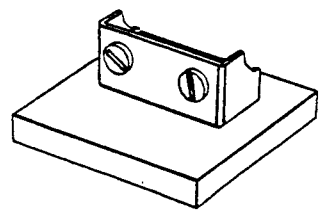
Fig. 5A
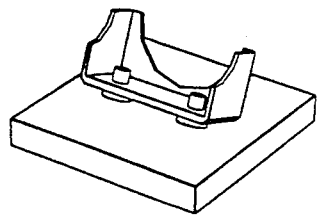 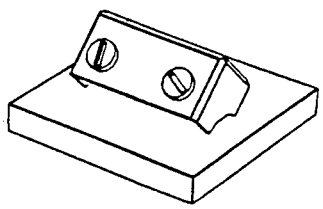 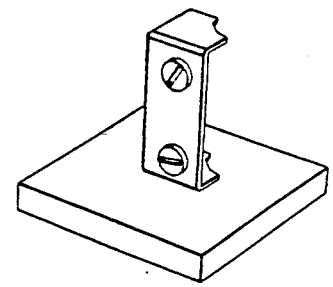
Fig. 5B  Fig. 5C  Fig. 5D
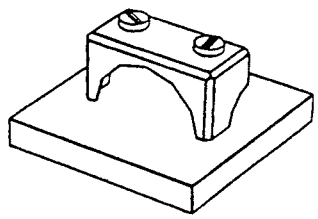 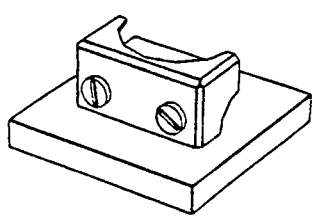 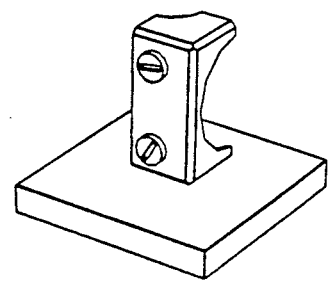
Fig. 5E  Fig. 5F  Fig. 5G

INITIAL STATE

GOAL STATE

OPERATION PLANNING SYSTEM FOR ROBOT

BACKGROUND OF THE INVENTION

1. Field of the Invention

The present invention relates to a robot operation planning system for planning an operation in which a robot grasps and moves an object which may be placed in various three-dimensional environments.

2. Description of the Related Art

There is known a robot operation planning system for automatically determining a plan of action in which a robot performs the grasping, movement and pick-and-place operations of an object between its initial state and each of various goal states such as during an assembly process and others.

One of the robot operation plans is a grasp plan. In the grasp plan, it is probably preferred that from the viewpoint of easy operation during the approach to a grasp orientation or after being grasped, an object manipulated by the robot is situated as far away from surrounding obstacles as possible.

We have proposed a grasp planning method which utilizes space characterization near the grasping position such that an object can be grasped by the robot from a widely opened space in both the pick and place operations (THE FIFTH ANNUAL MEETING OF ROBOTICS SOCIETY OF JAPAN, November 1987).

In our proposal, we perform a space characterization around an object in each of its initial and goal states. Such a space characterization is accomplished by dividing the space around the object into triangular pyramids (space pyramids) and investigating interferences between all the space pyramids and surrounding obstacles. More particularly, we determine space pyramids each having a first distance (depth) between its apex (grasp position) and an obstacle around that pyramid, this depth being equal to or larger than the distance required for the gripping portion (hand) of a robot to exist and also for the hand to be able to approach the object, that is, open space pyramids.

Next, we determine each of these open space pyramids both in the initial and goal states and select open space pyramids common to both the initial and goal states, that is, common open space pyramids. In order to investigate the distribution of these common open space pyramids, distance transformation is carried out for all the common open space pyramids. This distance transformation is accomplished by determining the minimum distance between each of the common open space pyramids and the relevant open space pyramid not selected as a common open space pyramid. Open space pyramids having larger distance transformation values indicate a widely opened space which is more or less unoccupied by obstacles.

A grasp position is thus determined by selecting a common open space pyramid having the maximum distance transformation value from the open space pyramids intersecting a central grasp plane formed between two parallel planes on the object, while considering the stable grasping of the object by two parallel fingers.

Our proposal mentioned above can grasp an object from a direction in which there is a widely opened space, as far away as possible from any surrounding obstacles. As a result, a plan of the least problematic pick-and-place operation can be determined.

However, our previous proposal considers only the relationship between an object and the hand of a robot at the central gripping plane on selecting the grasp orientation relative to the object. Therefore, the robot hand may interfere with the object in the determined grasp position and orientation. It was thus required that after determining the grasp position and orientation, the judgement was made as to whether or not the actual grasping was feasible on the basis of the place positions and geometric data of the robot hand and the object. Since the avoidance of interference between the object and the hand was carried out in the trial-and-error manner, the plan could not efficiently be determined.

In certain operation plans, the hand cannot transfer from its initial state directly to its goal state. Instead, the hand intermediately places the grasped object and re-grasps the placed object in order to transfer it to the goal position. In the past, there was known a technique for planning regrasping which had previously provided data of the list position of the hand on gripping and regrasping location (see P. Tournassoud, T. Lozano-Perez, "Regrasping", Proc. IEEE International Conference on Robotics and Automation, pp. 1924–1928, Vol. 3, 1987).

In the actual grasp plan, the feasible grasp position varies depending on changes in the environment. Thus, a previously determined grasp position may be infeasible in a subsequent operation. This means that the grasp plan itself fails. Particularly, when the regrasping operation is to be used, the environment around the hand and the object will vary for each pick-and-place operation. This results in an increase in the probability that the previously determined grasp position will be incorrect.

If several pick-and-place operations were to be performed, the regrasping locations could not be selected automatically.

In an operation plan including the regrasping step, an object must be first picked up and then placed on a table and transferred to the next state after the grasp position and orientation has been changed in the hand. In the normal case, however, there are a great number of the object's positions and orientations through which the object can be placed on the table. This will provide a corresponding number of state transition paths from the initial state to the goal state. If an estimation is made with respect to work efficiency in all the combinations, the processing time period becomes huge.

Our previous proposal has a further problem in that it provides an inefficient grasp plan or plans excessive regrasps, in the case that the objects have rotational symmetries.

SUMMARY OF THE INVENTION

It is therefore an object of the present invention to provide a robot operation planning system which can determine a state transition path accurately at high-speed.

Another object of the present invention is to provide a robot operation planning system which can plan appropriate grasp positions and orientations of the hand by estimating the easy motion of the hand from various factors such as the initial and goal states of the object, states of obstacles around the object, the geometric data of the hand and others.

Still another object of the present invention is to provide a robot operation planning system capable of efficiently selecting a grasp position and hand orientation at which an object can be actually grasped and which position is spaced apart from obstacles around the object.

A further object of the present invention is to provide a robot operation planning system which can provide an efficient grasp plan in consideration of the rotational symmetry of the objects.

A further object of the present invention is to provide a robot operation planning system which can also plan placements of the objects for regrasping.

The presente invention provides a robot operation planning system comprising grasp candidate calculation means for evaluating candidates for the grasping position and orientation which can grasp an object, at least based on the geometric date of said object and the hand of a robot; open space pyramid selecting means for dividing the space around said object into space pyramids each having an apex corresponding to the grasp position and havnig a predetermined magnitude and for selecting open space pyramids having no interference with surrounding obstacles from said divided space pyramids; distance transforming means for determining the distance between each of the selected open space pyramids and the relevant obstacle around said object; and grasp selecting means for determining the grasp position and orientation of the robot hand, based on both the distance of the respective open space pyramids determined by said distance transforming means and the grasp candidate calculated by said grasp candidate calculating means.

In accordance with the present invention, previous determination is made of the candidates for grasping position and orientation sets which will not interfere with the object and the obstacles around the object. From these candidates, there are selected grasp positions and orientations which are appropriate, based on their distance transformation values. The grasp candidates thus selected are necessarily feasible. Therefore, an efficient grasp plan can be provided in accordance with the present invention.

The present invention also provides a robot operation planning system comprising stable state calculating means for determining a stable state from geometric data of an object, that is a state in which the object can be stably placed on a table; and state transition path searching means for selecting a stable state to proceed to by judging whether or not the transition itself is possible and also whether or not it is then possible to transit from the stable state to a goal state, whereby a given state searching process can be utilized to determine a state transition path by judging whether or not the robot can transit from a selected state to the goal state when the robot is to be moved from the initial state through the stable state to the goal state.

Thus, the state transition path is determined while it is always being judged whether or not the robot can transit to the goal state. Therefore, estimation is not required to be performed with respect to all the possible combinations of states. If a solution meeting the requirement is found, the calculation may be stopped. Consequently, the robot operation plan may be provided efficiently.

The present invention further provides a robot operation planning system comprising grasp candidate calculation means for calculating candidates capable of grasping and pick-and-place an object, based on the initial and goal states of said object, the environmental state in the initial and goal states and the geometric data of the robot hand; open space pyramid selecting means for dividing the space around each of the grasp positions into space pyramids, each having its apex at the corresponding grasp position and having a predetermined magnitude, and for selecting open space pyramids, having no interference with obstacles around the object, from the divided space pyramids; distance transforming means for determining the distance between each of said selected open space pyramids and the relevant non-open space pyramid; grasp candidate selecting means for selecting an appropriate pick-and-place grasp candidate from the candidates calculated at said grasp candidate calculating means in consideration of said distances and how the obstacles affect the joint angle or arm of the robot.

Thus, optimum grasp position and orientation can be planned from the environment around the object in the initial and goal states. Particularly, in an operation plan wherein a plurality of pick-and-place operations are to be performed, the positions and orientations of the robot hand in which an object can be easily grasped by the robot hand can be planned flexibly depending on the environment of the respective pick-and-place object positions. This can realize an effective regrasping plan.

BRIEF DESCRIPTION OF THE DRAWINGS

FIG. 5 is a view illustrating several examples of orientation at which the object can be stably placed on the table.

FIG. 10 is a view showing a state in which the object is placed on the table.

DETAILED DESCRIPTION OF THE PREFERRED EMBODIMENTS

General Arrangement

Figure 1:
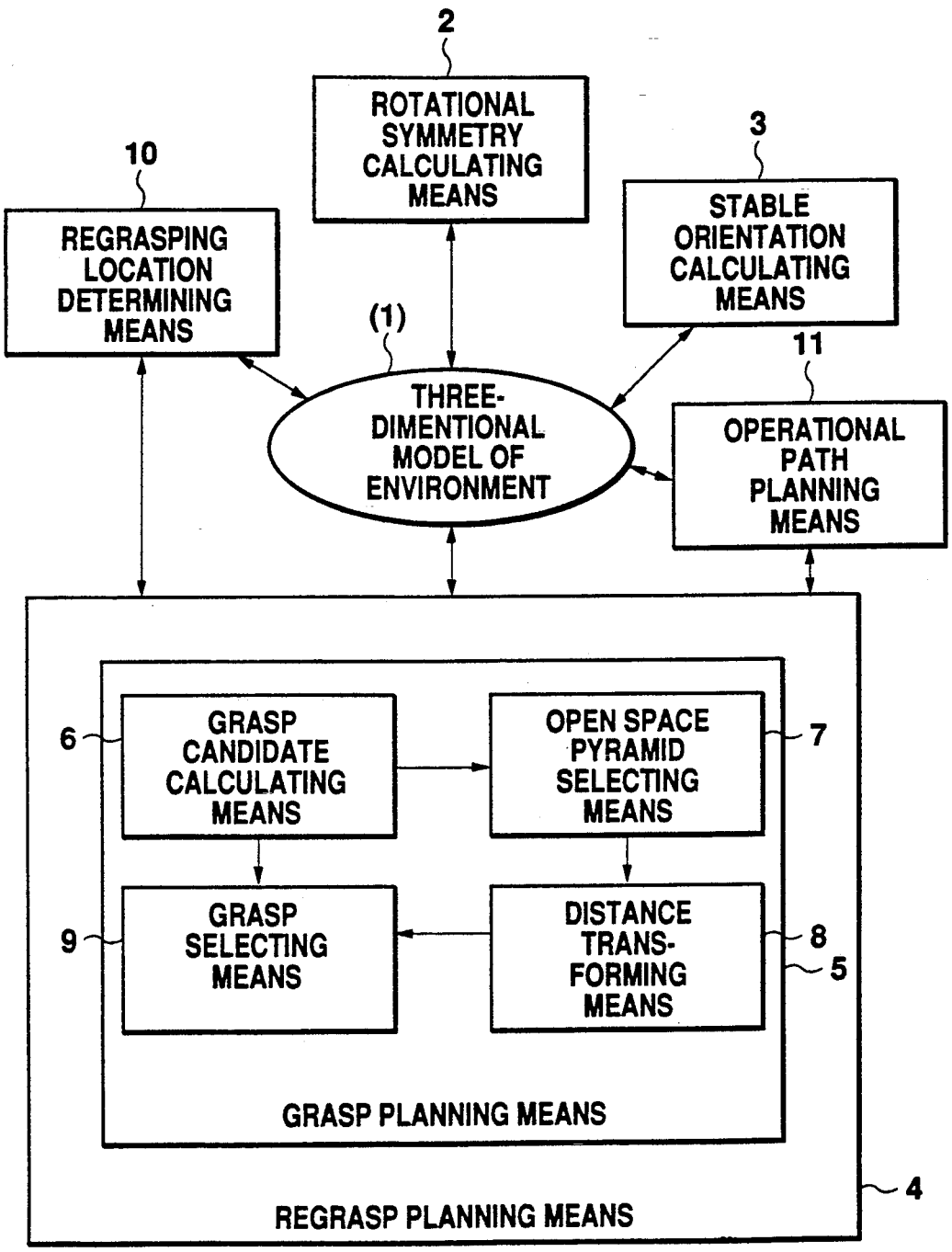
FIG. 1 is a block diagram of one embodiment of a robot operation planning system constructed in accordance with the present invention.

Referring to FIG. 1, there is shown the general arrangement of a robot operation planning system constructed in accordance with one embodiment of the present invention. This arrangement includes a three-dimensional model of the environment 1 in which various data such as the geometric data of objects to be handled, the positions and orientations of the objects at their initial and goal states, the geometric data of peripheral environments including the states of peripheral obstacles, the positions and orientations of these obstacles, the geometric data of robots and their hands, and the range of movement and so on are described. The data in the three-dimensional model is utilized to make an operation plan by performing various calculations. In this embodiment, the system comprises rotational symmetry calculating means 2 for calculating the rotational symmetry of an object to be handled and stable orientation calculating means 3 for determining a state in which the object can be stably placed on a table. Data obtained from the analysis at the rotational symmetry calculating means 2 and stable orientation calculating means 3 is fed back to the three-dimensional model of the environment 1 where data used to plan the desired work is prepared.

The three-dimensional model of the environment 1 is connected to regrasp planning means 4 which plans the regrasping operation. More particularly, the regrasp plan is made by searching the state space of the object with respect to a series of state transitions from the initial state to the goal state while investigating the probability of transition between the states. If a direct transition from the initial state to the goal state is possible, the regrasp planning means 4 plans the pick-and-place operation without regrasping. The details thereof will be described later.

The regrasp planning means 4 includes a grasp planning means 5 formed therein. The grasp planning means 5 comprises grasp candidate calculating means 6 for evaluating candidates for grasp positions and orientations at each of which the object can be picked and placed by the hand, at least based on the geometric data of the object and the hand; open space pyramid selecting means 7 for dividing the space around each of the grasp positions into space pyramids, each having its apex at the corresponding grasp position and having a predetermined magnitude, and for selecting open space pyramids, having no interference with obstacles around the object, from the divided space pyramids; distance transforming means 8 for determining the distance between each of said selected open space pyramids and the relevant non-open space pyramid; grasp candidate selecting means 9 for selecting an appropriate pick-and-place grasp candidate from the candidates calculated at said grasp candidate calculating means 6 in consideration of said distances and how the obstacles affect the joint angle or arm of the robot. In such a manner, the grasp planning means 5 plans a grasp operation for a pick-and-place in which the hand can be easily moved and the operational path can be readily planned. The grasp planning means 5 is adapted to judge the probability of transition between the states of the object.

The three-dimensional model of the environment 1 is also connected to regrasp location determining means 10 which is adapted to determine a regrasp location, if required.

The three-dimensional model of the environment 1 is further connected to operational path planning means 11 for planning the operational path of the robot between the respective planned grasps, based on data including the geometric data of the three-dimensional model of the environment, the robot and so on.

Figure 2:
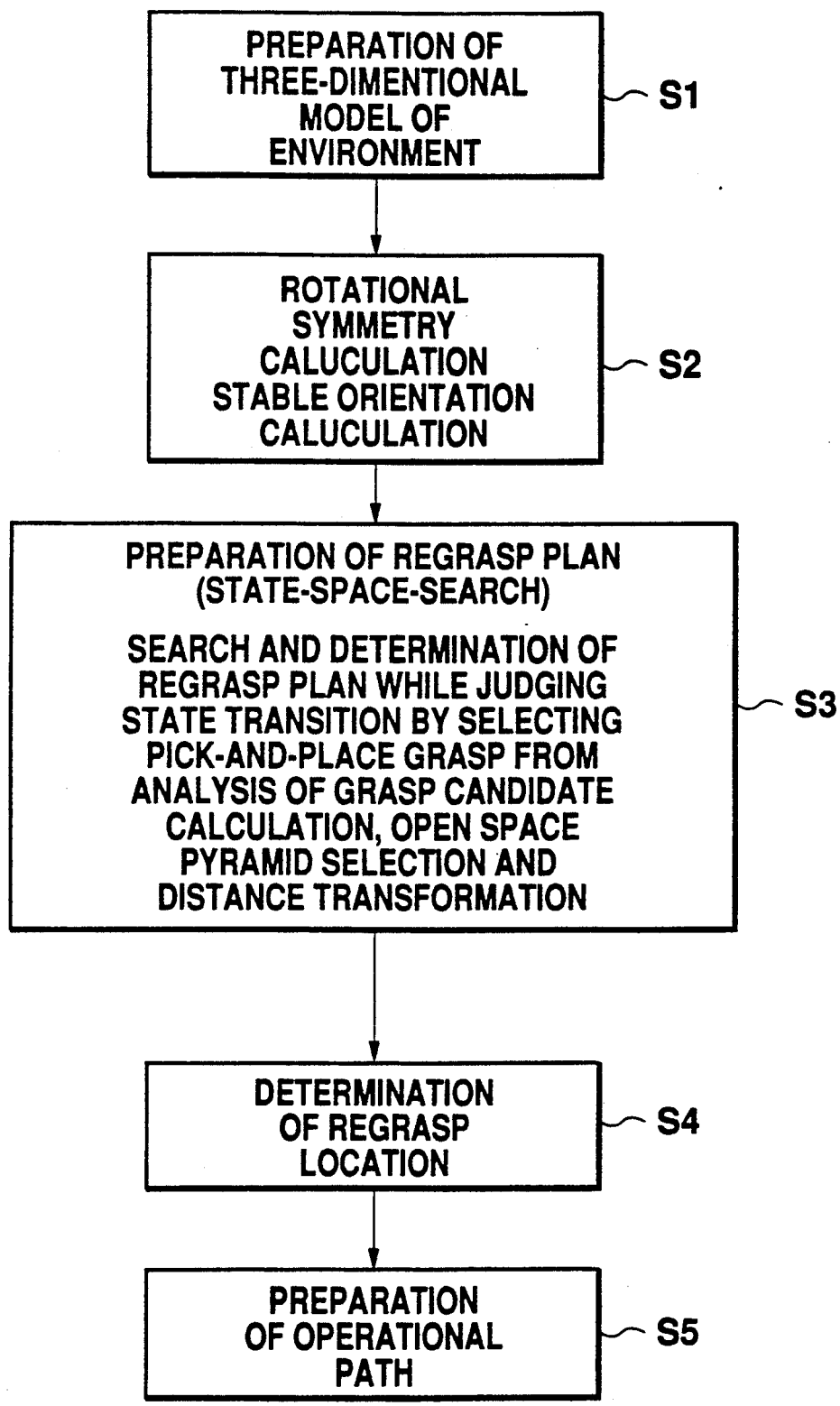
FIG. 2 is a flow chart illustrating the entire operation of the robot operation planning system constructed in accordance with the present invention.

Referring next to FIG. 2, a three-dimensional model of the environment 1 is first prepared from data including the initial state, goal state, peripheral environment and others (S1). From the geometric data of an object in this three-dimensional model of the environment 1, the rotational symmetry of the object is calculated by the rotational symmetry calculating means 2 and the stable orientation of the object is calculated by the stable orientation calculating means 3 (S2). These results are described in the three-dimensional model of the environment 1.

The regrasp planning means 4 then searches the state space while performing the place-and-place grasp plan to prepare a regrasp plan (S3).

Subsequently, the regrasp location determining means 9 determines a regrasp location according to the regrasp plan (S4). Finally, the operational path preparing means 10 plans an operational path connecting the grasp position and orientation of the hand, based on both the regrasp plan and regrasp location (S5).

The contents of the aforementioned steps (S1-S5) will be sequentially described below.

Preparation of Three-dimensional Model of Environment (S1)

For an operation plan, various data such as the geometric data, position orientation and position of an object to be handled in the work, the geometric data of obstacles in the working environment and so on must already be known. These data are first inputted to the system. The input may be manually accomplished through a keyboard or automatically made through a visual system. Three-dimensional spatial data relating to the initial and goal states are thus described in the three-dimensional model of the environment 1.

Calculation of Rotational Symmetry (S2)

Depending on the shape of the object to be handled, grasps whose positions and orientations are different may be substantially equivalent. For example, if an object is symmetrical about its vertical axis, both the cases where the object is grasped by the hand from the right and left sides may be substantially equivalent. If these equivalent grasps are separately taken in the system, excessive grasps may be required or the plan may be unnecessarily complicated. In order to overcome such problems, the rotational symmetry calculating means 2 performs a given calculation to recognize the rotational symmetry of the object from the geometric data thereof.

Figures 3A, 3B, 3C:
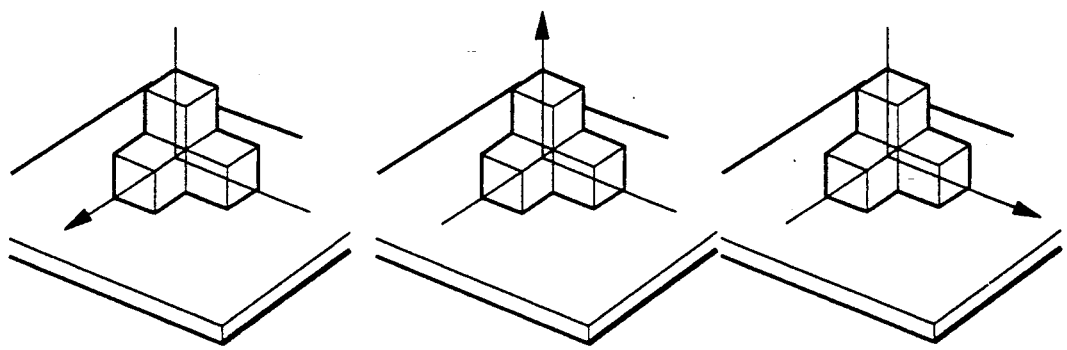
FIGS. 3A-3C are views illustrating the rotational symmetry of an object.
Figure 4A:
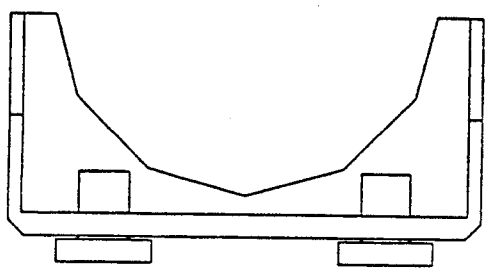
FIG. 4 is a view illustrating the geometric model of an object to be handled in the present invention.
Figure 4B:
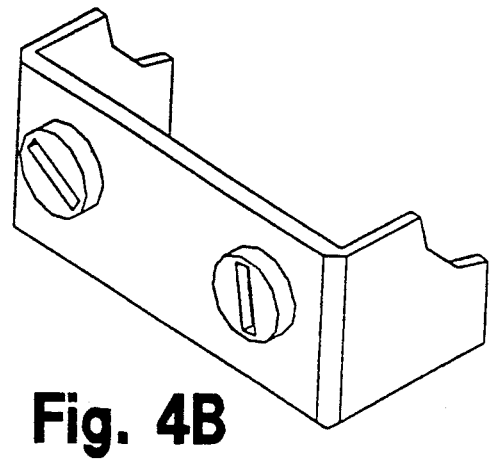
Figure 4C:
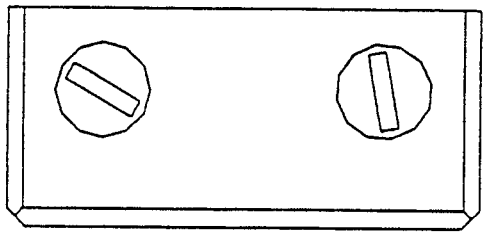
Figure 4D:
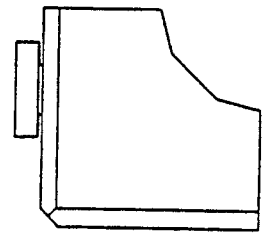

FIG. 3 shows an example of objects that have three rotational symmetries.

Algorithm of Calculating Rotational Symmetry (S2)

An algorithm of rotational symmetry will be shown below. A process of utilizing such rotational symmetry will be described in detail together with the utilization of the rotational symmetry.

(1) A certain face of the object is rotated about the center of gravity of the object to determine the transformation by which that face becomes coincident with the other faces of the object (including said face itself).

More particularly, initial checks are made with respect to there being correlation of four parameters, namely:

(a) Area;
(b) Perimeter;
(c) Distance from the center of gravity of the object to the center of gravity of the face; and
(d) Angle included between the vector extending from the center of gravity of the object and the center of gravity of the face and the normal vector of the face.

With respect to the faces meeting the conditions (a) to (c), the program then determines a transformation by which the faces become coincident with each other as follows: If the angle included between the vector extending from the center of gravity of the object to the center of gravity of the face and the normal vector on the face is other than zero, there is only one rotational transformation which is about the center of gravity of the object and has the possibility of face compatibility. Such a rotational transformation is thus used to determine the coincident faces as well as the symmetrical transformation.

On the other hand, if the angle included between the vector extending from the center of gravity of the object to the center of gravity of the face and the normal vector on the face is equal to zero, there remains a degree of rotational freedom about the vector extending from the center of gravity of the object to the center of gravity of the face. From the lengths and angles of the edges of the face, the program investigates whether or not the faces can coincide with each other and determines a transformation by which the faces become coincident with each other by the rotation about this vector.

(2) The program investigates whether or not the transformation determined at the step (1) is actually the symmetrical transformation. More particularly, the program applies the same transformation to all the apexes of the object and examines whether or not all the transformed vertices become those of the object before the transformation. A list of the transformations by which the faces become coincident with each other is then returned to the system.

(3) Duplicate transformations are canceled from the list determined at the step (2).

In such a manner, a description can be made with respect to orientations being identical due to the rotational symmetry.

Calculation of Stable Orientation (S2)

When the regrasping operation is to be planned, an object must be placed on a table. The stable orientation calculating means 3 calculates, based on the geometric data of the object, a stable orientation in which the object can be placed on the horizontal table. More particularly, for use in the calculation of stable orientation, the object is assumed to be encased in a cocoon. This cocoon can be considered to be shaped as follows. In any stable position the horizontal plane which represents the table surface is taken to be a surface of the cocoon. Therefore, an object having a stable positions will have a cocoon which will be a polyhedron having n surfaces. Then, if the line normal to the table surface is normal to any face of the cocoon when the object is in a particular orientation, that orientation is such that the object can be stably placed on the desk. With such an object as shown in FIG. 4, for example, the object can be placed on the table in the respective one of seven stable orientations shown in FIGS. 5. The stable orientations thus obtained are serially numbered.

Regrasp Plan (S3)

The summary of the regrasp plane is described herein. The primary process thereof, "pick-and-place grasp plan", will be described later in detail.

The regrasp plan must determine where and at which orientation the object should be placed on the table on regrasping. The pick-and-place grasp plan will be prepared while moving the object from the initial position to the regrasp position and from the regrasp position to the goal position. Depending on the number of regrasps, the pick-and-place grasp plan may have to be made with respect to the movement of the object from one regrasp position to the next regrasp position.

It is believed that such a regrasp plan raises a problem when preparing a series of state transitions where the object is moved from a state of the object to another. Such a problem can be solved by the state space searching process if the states of the object are defined, as well as operations by which the transitions between the states can be realized.

The states of the object includes initial state, goal state, and an infinite number of regrasping states when the object is placed on the table for regrasp. Each of the regrasps includes four parameters, n stable orientations (b: integers from 1 to n) in which the object can be stably placed on the table; position (X, Y) of the object on the table; rotational angle ($\theta$) about an apparent vertical axis.

If the whole search is performed immediately after a four-dimensional space has been set by these four parameters as the regrasp states of the object, a huge time is required to compute the search. To reduce it, the regrasping problem is divided into two subproblems: one is a state-space-search to select the stable orientations of the object and to plan grasps, and the other is to decide the location (X, Y and $\theta$) of the object in regrasping states. More particularly, on preparing the series of state transitions, only the stable orientation (b) is considered as a parameter of the regrasp state of the object. The regrasp position [position on the table (x, y) and rotational angle ($\theta$) about the apparent vertical axis] will not be specified. Thus, in the regrasp state, the position and orientation for grasping will be determined only from geometric data of the hand and table without the need to consider the robot arm or obstacles around the object. In this respect, the operation is performed by the grasp planning means 5. As will be described, the object is regrasped by the hand from a position that is spaced as far away as possible from the table. Thus, it is unlikely that the operation will be affected by the obstacles on the table. The re-grasp location can be determined more easily. After the series of state transitions has been determined, the regrasp locations (x, y and $\theta$) will be determined.

The state space search utilized in the preparation of the regrasp plan will be performed as follows: The position and orientation for regrasp is planned by a search wherein the object is repeatedly moved from its initial state through state transitions in the pick-and-place grasp plan to the goal state. The state transitions according to the pick-and place grasp plan are accomplished by the grasp planning means 5. If the pick-and-place grasp plan is successfully made by the grasp planning means 5, it is judged that a transition between two states is possible. The search will proceed until this occurs.

The search algorithm is A * algorithm in which a function used to estimate the search is the number of pick-and-place operations. If a regrasp is required, thus, a single pick-and-place operation plan is performed. In cases other than the above case, the regrasp plan will be outputted which provides the minimum number of regrasps.

State Transition Path Plan (S3)

This embodiment separately performs the grasp plan made during the preparation of the series of state transition and the plan of regrasping locations. More particularly, in the process of preparing the series of state transitions, the state of the object on regrasping is represented only by its stable orientation (b). Thus, the state space of the object will be defined only by the initial state, goal state and plural regrasp states.

Since the rotational symmetry is also considered at this time, the state space of an object having a symmetry is reduced. This can remove any excessive search calculations.

With the above object, its state space includes a total of nine states consisting of two states, initial and goal states, in addition to said seven regrasp states.

The series of state transitions between the initial and goal states is determined by repeating pick-and-place operations starting from the initial state in the state space. In this case, the state transitions with respect to all the combinations of states will not be estimated. The search will be performed basically by using the A * algorithm in the state space searching process.

Search Algorithm (S3)

The search algorithm will be described by using graph symbols.

This graph is defined by a set of nodes. It is now assumed that each pair of adjacent nodes is connected together by an oriented branch. If the branch is oriented a node n to another node m, the node m is defined to be a continual node for the node n. On the other hand, the node n is defined to be a parent node for the node m.

When it is wanted to display a state space by using the graph, a state characterization is written in the node and a pick-and-place operator is added to the branch. Determination of the continual node by causing the operator to act on the node n is referred to as "expand the node n".

In the search for the regrasp problem by utilizing the aforementioned state space, there is a possibility that the goal and stable regrasp orientation states becomes continual nodes from the expansion of nodes. More possible continual nodes are prepared one by one. The possibility that other continual nodes are subsequently prepared is left to the remainder of the search. In other words, the grasp planning means 5 first attempts to shift the node to the goal node (goal state).

Subsequently, the expansion is tried one at a time in the order of the numbered stable orientations until a path having the minimum cost is selected. In each of the nodes, the number of expansions is defined for indicating the number of attempts in each of which an expansion is made to a continual node so as to determine the next expanding state.

In order to realize the A * algorithm, $h_0 \geq h$ must be established when a totally estimated cost value f is defined by $f = g + h$ where a cost consumed until reaching any state is g and the minimum expected cost value consumed from said state to the goal state is h and where the actual cost of the minimum path from said state to the goal state is $h_0$.

It is assumed herein that the number of pick-and-place operations is the cost value. Therefore, the value h becomes one (1) if it is possible to perform the expansion toward the goal node and two (2) if the attempt of the expansion toward the goal node has already failed. Thus, the aforementioned condition, $h_0 \geq h$, can be established. It is understood from the foregoing that the minimum path can be induced by the A * algorithm at all times.

Since it is possible that all the nodes are located adjacent the goal node, a node whose continual nodes may include the goal node, that is, have its value h equal to one (1) is preferentially expanded if there are a plurality of nodes having the same value f. If there are a plurality of nodes having the same values f and g, it appears to be very possible that these nodes exist on a path in which a regrasp orientation which has not been expanded becomes a key. Thus, a node which is more suitable to the expansion is preferentially expanded.

The procedure will be described in more detail.

(1) A start node is written into a list which will be called "OPEN".

(2) If OPEN is empty, the program terminates in a failure. On the contrary, if OPEN is not empty, the program proceeds to the next step.

(3) A node having the minimum value for f is taken out of OPEN. If there are a plurality of such nodes, a node having the value equal to one is taken out of OPEN. If there are a plurality of secondly mentioned nodes, a node having the maximum number of expansions is taken out of OPEN (since the order of each node to be expanded is predetermined, this provides an expansion against nodes which have not been expanded). The node so selected is called "n".

(4) If the node n is a goal node, the program follows a pointer to induce a path providing a solution and terminates in success. If the node n is not a goal node, the program proceeds to the next step.

(5) An expansion is tried by preparing a continual node depending on the number of expansions. At this time, it is assumed that the number of expansions is zero at a new continual node. If the number of expansions is zero at the node n, the expansion is tried toward the goal node. If the number of expansions is other than zero, the expansion is tried to provide stable orientations equal to that number of expansions. The number of expansions at the node n is increased by one (1). If the number of expansions is equal to the number of stable orientations plus one at the node n, it means that all the expansions against the stable orientations are completed. Data is taken out of OPEN and placed into another list which is called "CLOSED". If no expansion has been done, the program returns to the step (2).

(6) If no continual node exists in OPEN or CLOSED, the new continual node is inputted into OPEN and marked with a pointer returning from the continual node to the node n.

(7) If any old continual node exists in OPEN, the estimation value f of the new continual node is compared with that of the old contiual node. The node having a smaller estimation value is left in OPEN.

(8) If any old continual node exists in CLOSED, the estimation value f of the new continual node is compared with that of the old continual node. If the estimation value of the new continual node is smaller than that of the old continual node, the latter is taken out of CLOSED and the new continual node is taken into OPEN.

(9) The program then returns to the step (2).

The value g of a node depends on the number of nodes followed by the program while following pointers. The value f is equal to one (1) since the node may transit to the goal node in the next expansion if the number of expansions in that node is zero. On the other hand, if the number of expansions is equal to or more than one (1), the program will proceed to the goal node once through a stable orientation. Therefore, the value f becomes two.

In such a manner, the series of state transition is determined by selecting the transition states while selecting the nodes having smaller estimation values f. At the goal node, thus, it is ensured that the path taken is minimum.

In accordance with the series of pick-and-place, an operation path which will not interfere with obstacles around the object is prepared by utilizing the known operation planning technique.

In such a manner, the entire operation plan can be prepared.

Determination of Regrasp Location (S4)

When a series of state transitions with regrasp operation is prepared, the program analyzes the two-dimensional space on the table to search for a widely opened location which is affected as little as possible by obstacles around the object. In consideration of the range in which the arm is movable, the program searches a regrasp location preferentially starting from a space which probably contains the above range. This efficiently determines a regrasp location.

While the program circulates with a given interval, it checks whether or not both the pick-object and place-object grasps in that regrasp state are possible. If actually possible data x, y and $\theta$ are found, and that position is determined as a regrasp location.

Figure 6C:
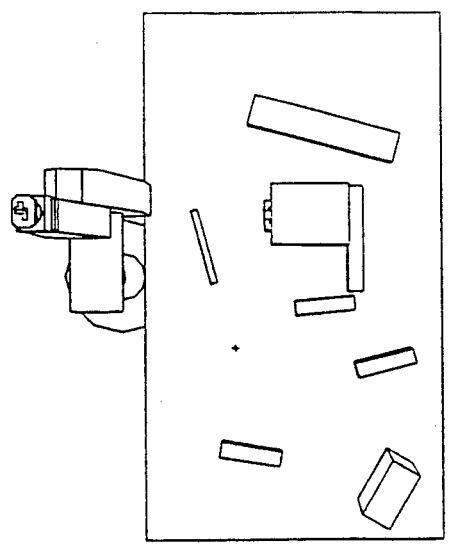
FIGS. 6A-6C are views illustrating the determination of a regrasping location.
Figure 6B:
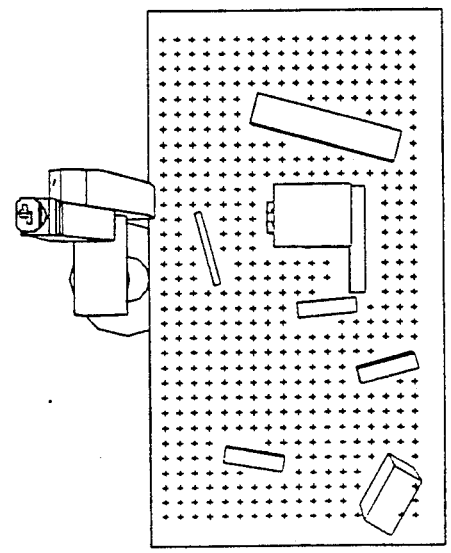
Figure 6A:
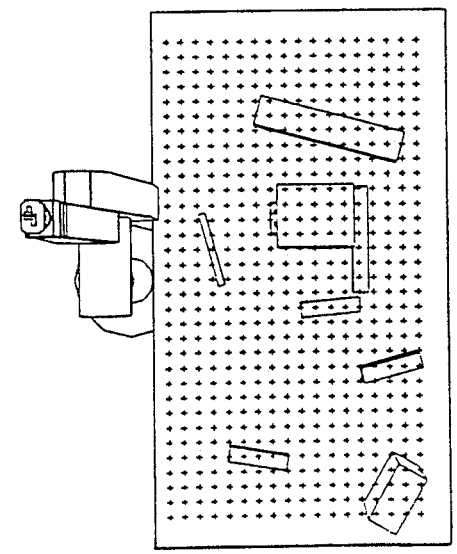

FIG. 6A shows a region in the two-dimensional space on the table which is to be analyzed. Within such a region, a regrasp location is determined as follows:

1. A working space in which a manipulator (robot's hand) is workable on the table is divided into small squares (herein having each side equal to 5 cm) which are in turn classified into cell areas in which any obstacle other than the object to be grasped exists (obstacle space) and cell areas in which an obstacle does not exist (free space). Cells belonging to this free space are shown in FIG. 6B.

2. The distance transformation from the obstacle space is performed to each of the cells in the free space on the table. This provides an index which indicates how far each cell is spaced apart from the obstacle.

3. If a cell is located at a position within the range of movability of the robot (spaced apart from the center of the robot within a given distance) and has the highest distance transformation value, it is selected as a candidate for the regrasp location. In such a manner, cells selected as candidates are marked by "+", as shown in FIG. 6C.

4. An object to be regrasped is placed at the positions indicated by the candidates for regrasp locations. While the rotational angle $\theta$ is rotated with a given interval, the interference check is performed to see whether or not both the pick-object and place-object grasps in the regrasp state are feasible. If an actually possible angle $\theta$ is found, it is judged to be a regrasp location. If not, the program returns to the step 3 and initiates the selection of another candidate.

Preparation of Operation Path (S5)

In accordance with the planned series of pick-and-place grasp operations, the known operation planning technique is utilized to plan an operation path which will not interfere with obstacles around the object.

Pick-and-Place Grasp Plan (S3)

Figure 7:
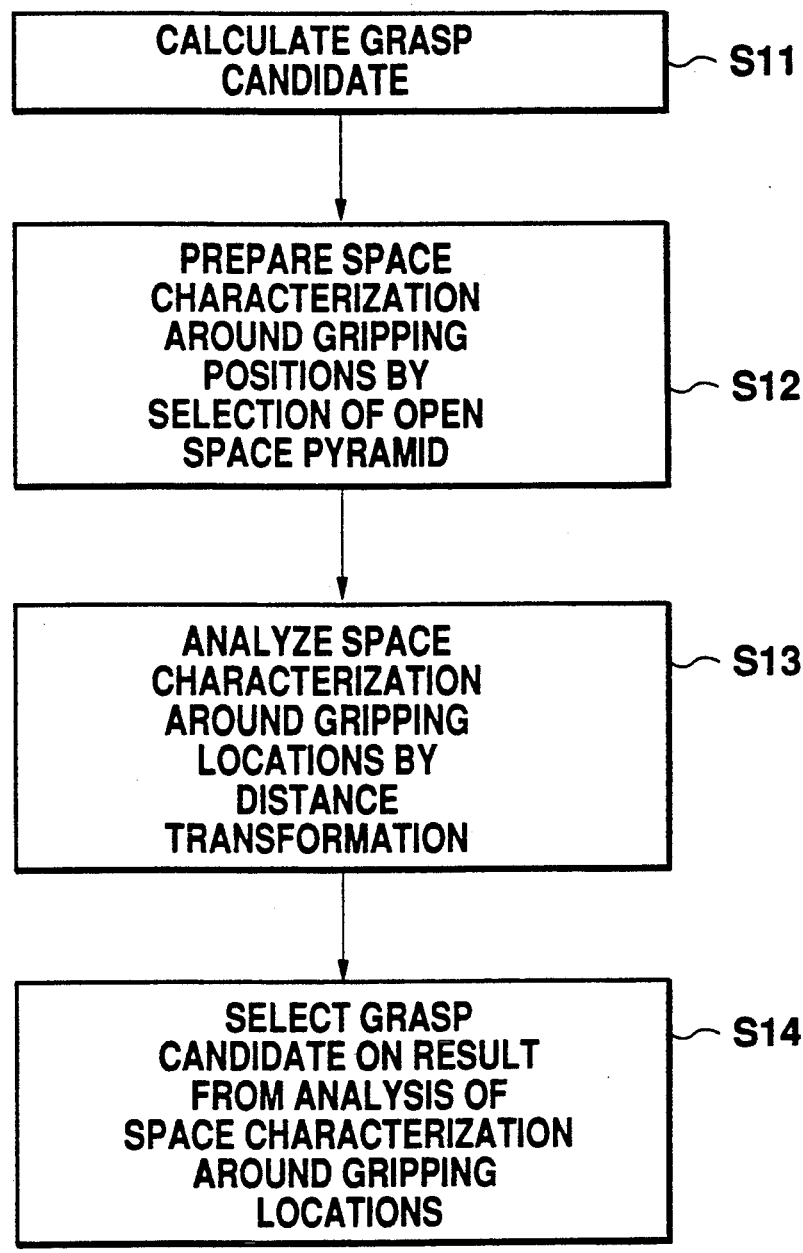
FIG. 7 is a flow chart illustrating the operation of grasp planning means according to this embodiment.

The pick-and-place grasp plan, which is a primary step in the aforementioned regrasp plan, will be described in connection with FIG. 7 which shows a flow chart.

First of all, the grasp candidate calculating means 6 prepares a candidate for a grasp position and orientation of the hand at which the object can be picked and placed on the table (S11).

Next, the open space pyramid selecting means 7 prepares a space characterization around the grasp location of the grasp candidate (S12). The distance transforming means 8 analyzes the space characterization to provide an estimation for the pick-and-place place grasp candidate with respect to the easy motion of the hand (spatial spread) (S13).

Finally, the grasp selecting means 9 selects an appropriate grasp position and orientation from the grasp candidate, in consideration of the analysis results, robot joint angles and arm obstacles.

Calculation of Pick-and-Place Grasp Candidate (S11)

Figure 8:
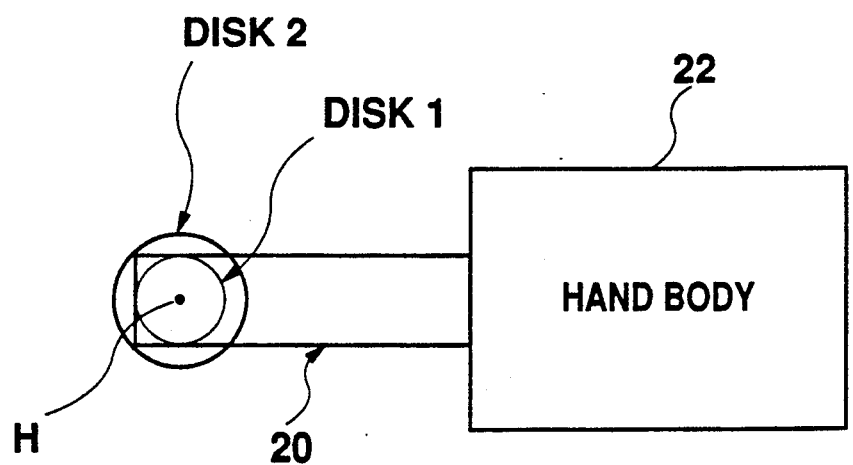
FIG. 8 is a view illustrating an approximate example of a finger means in the hand.
Figure 9A:
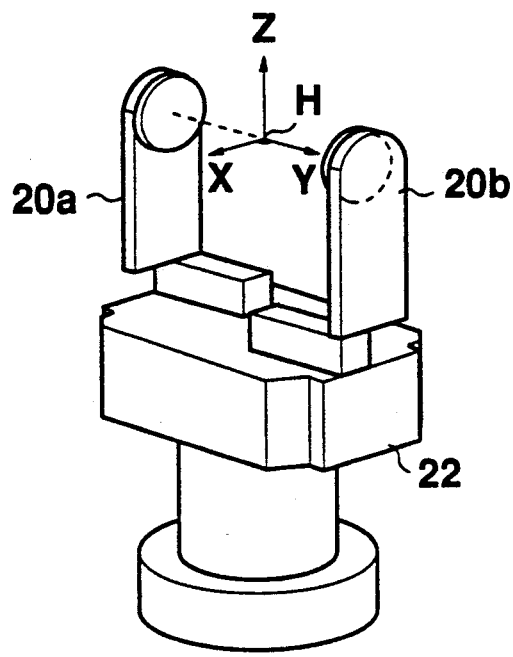
FIGS. 9A and 9B are views illustrating hand means according to this embodiment.
Figure 9B:
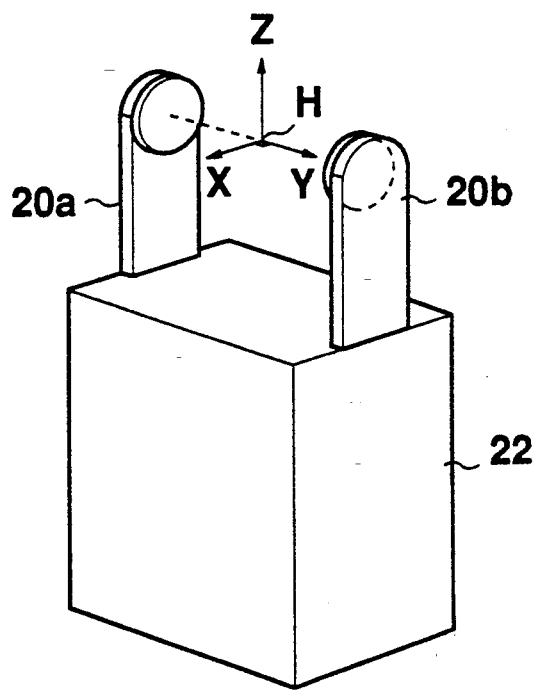

A pick-and-place grasp candidate in the robot will be calculated as follows:

If the finger tips of the hand are square, a circle inscribed within the square finger tip of each of the two fingers 20 in the hand (disk 1) is first established to provide an area adapted to make contact with the object to be grasped, as shown in FIG. 8. The center of this inscribed circle becomes the origin H of the hand. A circle which circumscribes the same square finger tip and having a center coincident with the origin H (disk 2) is established to provide an area which will not interfere with obstacles when grasping. The two-parallel-finger hand to be handled by this embodiment has a circular portion (disk) on each of the finger tips which is adapted to make contact with the object, as shown in FIG. 9(A). Therefore, the disk 1 is coincident with the disk 2. This hand approximates to a hand shown in FIG. 9(B), which comprises a rectangular parallelepiped hand body 22 and two fingers 20a and 20b.

There are set the following conditions under which an object can be stably grasped.

1. The disk 1 on the tip of each of two fingers 20a and 20b is in contact with an element on the object (face, side or apex). These two elements are called the "grasped element pair".

2. The grasped element pair are in surface contact with the corresponding faces of the object or in line contact with the corresponding sides of the object. At least one of these two different contacts should be a surface contact.

Figure 10:
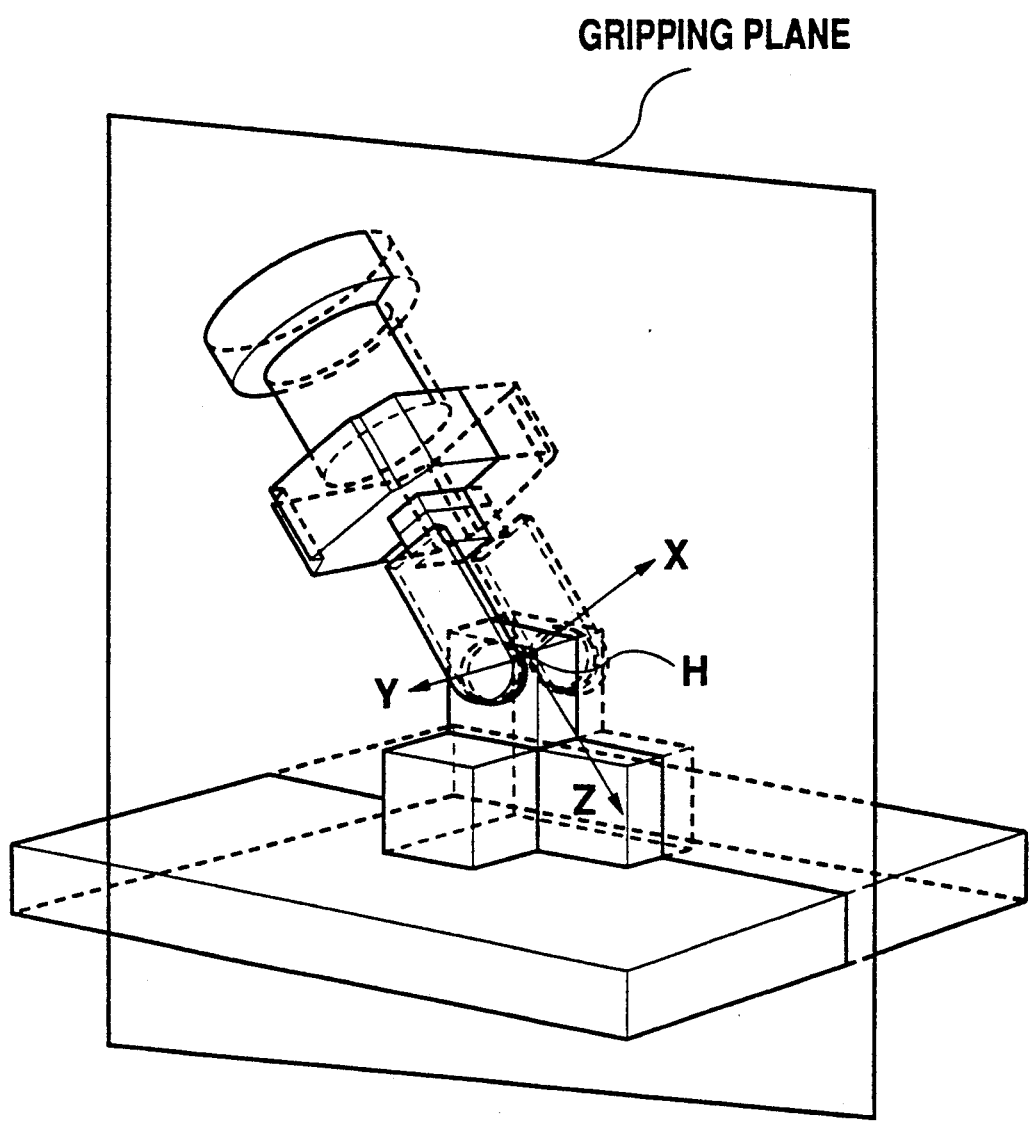
FIG. 10 is a view illustrating a gripping plane in which the object is grasped by the hand means.

When the object is grasped by the hand under such conditions, as shown in FIG. 10, the origin H of the hand is in a gripping plane which can be set centrally between the grasped element pair. The orientation of the hand will have a y-axis which is parallel to the normal line relative to the gripping plane. There are generally six degrees of freedom for determining the grasp position and orientation. With the two-parallel-finger type hand, grasp position and orientation of the hand whereby the hand does not interfere with the object or obstacles around the object will be determined within a space having three degrees of freedom which includes the positions of the hand origin H in the gripping plane (two degrees of freedom in the x-and z-axis directions of the hand) and the orientation of the hand (one degree of freedom about the y-axis of the hand). The pick-and-place grasp plan requires that both the pick-object and place-object grasps will not interfere with obstacles around the object.

Figure 11:
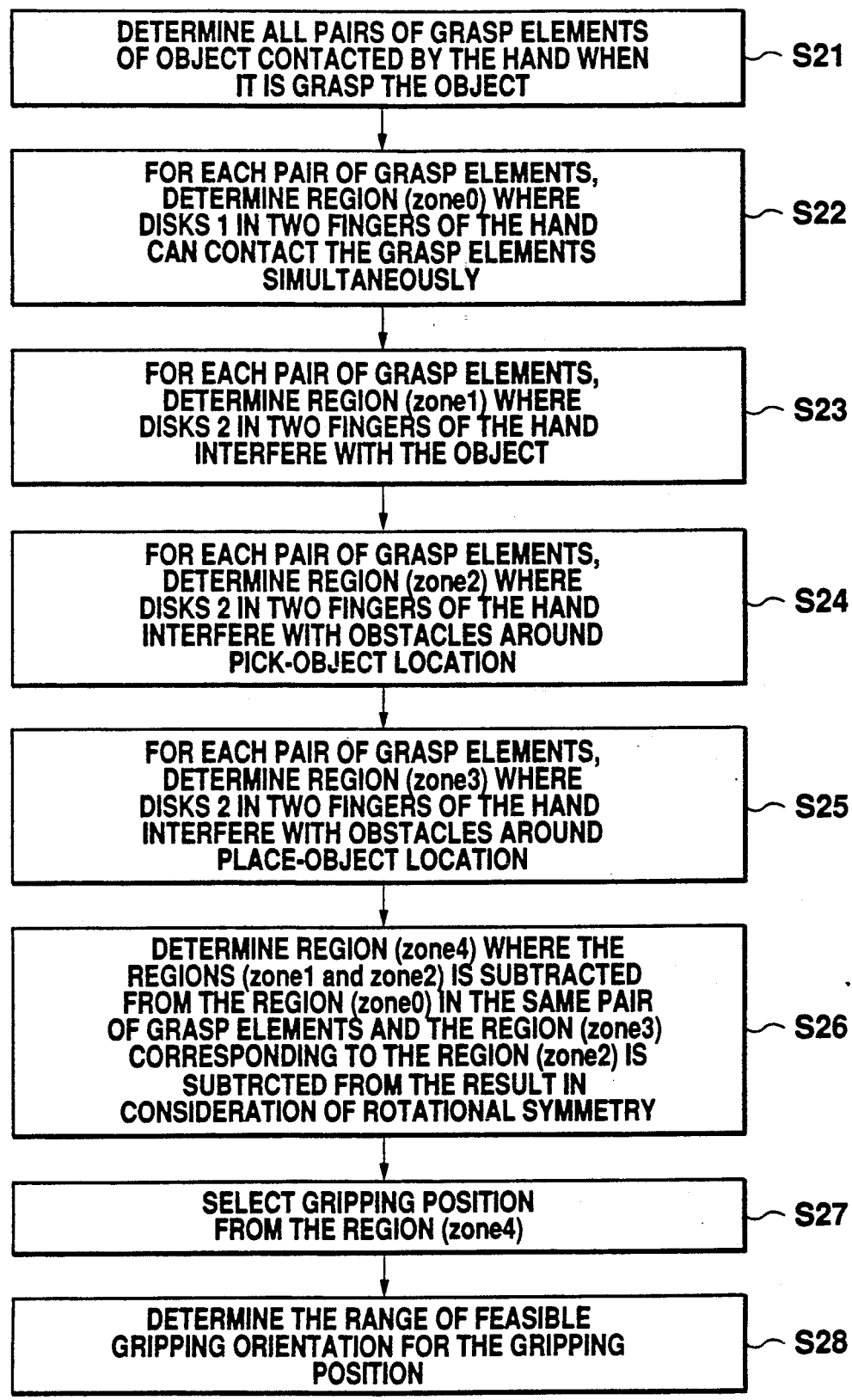
FIG. 11 is a flow chart illustrating the operation of grasp candidate calculating means according to this embodiment.
Figure 12:
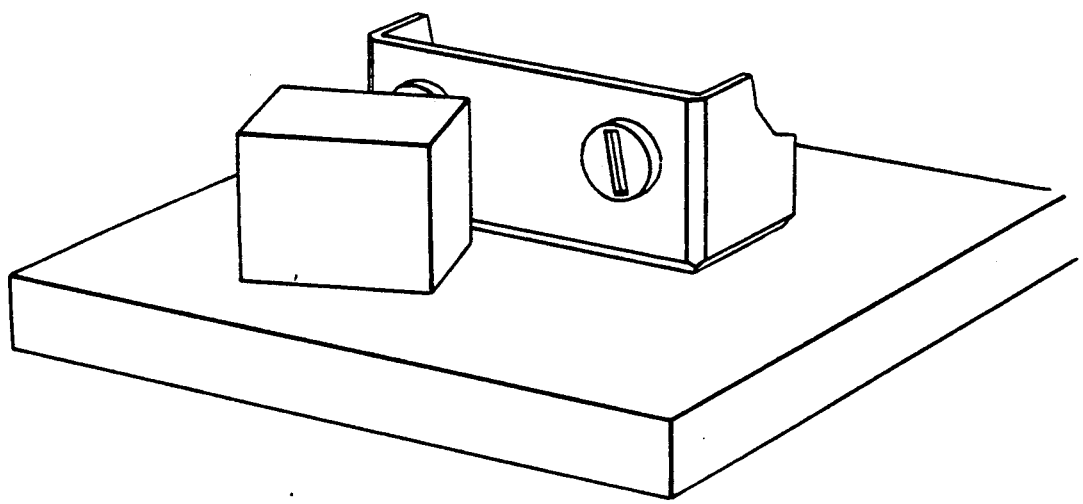

FIG. 11 shows a flow chart for calculating a grasp position candidate meeting such conditions and pick-and-place grasp candidates which are radially distributed about the grasp position candidate. The grasp position candidate may be a preselected grasp position. In such a case, only step S28 may be performed in the flow chart. The case where the object of FIG. 4 placed as shown is grasped by the grasp element pair (e1 and e2) of FIG. 12 will be described in detail.

[S21] First of all, all the grasped element pairs of the object contacting the disk 1 when the object is grasped by the hand (face-to-face, face-to-edge and face-to-vertex) are determined.

Figure 13:
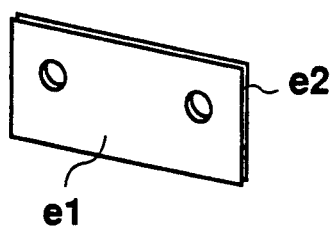
FIGS. 13-22 illustrate a calculation to determine grasp candidates.

These determined grasped element pairs are then subjected to the processing of steps S22 to S28. FIG. 13 shows one of the pairs so determined.

[S22] In consideration of the grasped element pairs, the program determines any H zone (zone 0) in which two disks 1 of the hand can contact the grasped element pair simultaneously.

Figure 14:
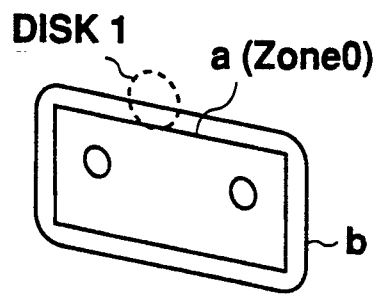

As shown in FIG. 14, the program first determines gripping plane for e1 and e2. The e1 and e2 are then projected onto the respective gripping plane to determine a common zone (shown by a in FIG. 14). The common zone is enlarged by an amount corresponding to the radius of the disk 1 (as shown by b in FIG. 14) to determine a graspable region. This is because it is believed that the object can be grasped if any portion of the finger tip (disk 1) in the hand contacts the object.

[S23] Subsequently, the program determines an H zone (zone 1) in which the two disks 2 interfere with the object or the grasping portions (disks 1) of the finger tips do not reach the object due to interference with the object since the length from the hand body to each of the finger tips (or the length of the finger) is short.

Figure 15:
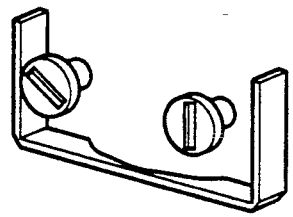
Figure 16:
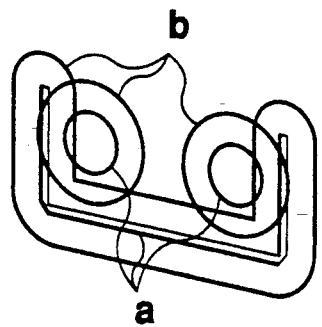

More particularly, when the hand is moved and the fingers are opened or closed by subjecting to any constraint from the grasp plane, the program determines overlapping parts between the object and a space which is swept by the fingers (FIG. 15). The overlapping parts are projected onto the grasp plane (as shown by a in FIG. 16) and enlarged by an amout corresponding to the radius of the disk 2 (as shown by b in FIG. 16).

Figure 17:
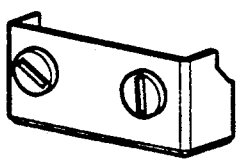
Figure 18:
Figure 19:
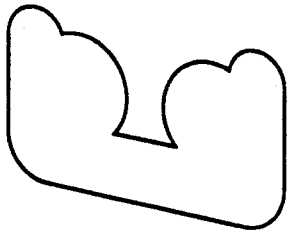

When the hand is moved by subjecting to the constraint from the gripping plane, the program determines overlapping parts between the object and the space which is swept by the hand body (FIG. 17), the overlapping parts being projected onto the grasp plane (FIG. 18). The zone is reduced by the length of the finger. In this embodiment, such a zone does not exist. Finally, these zones are summed (FIG. 19).

[S24] The program determines an H zone (zone 2) in which the two disks 2 interfere with obstacles around the object when picking up or the hand body does not reach the object due to interference with the obstacles because of the finger's length. Namely, the step similar to the step S23 is performed about the obstacles around the object on picking up (FIG. 20).

[S25] The program determines an H zone (zone 3) in which the two disks 2 interfere with obstacles around the object or the hand body does not reach the object due to interference with the obstacles around the object on placing since the finger's length is short. This step S25 performs the processing on placing, but is similar to the step S24 on picking up. In this example, the step S25 is omitted.

[S26] The program determines a zone (zone 4) obtained by subtracting the three zones 1, 2 and 3 from the zone 0. If no zone is obtained, the relevant grasped element pair cannot be grasped by the hand.

Figure 20:
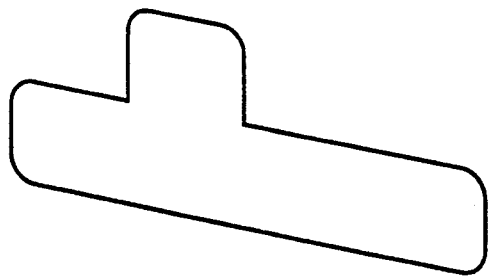

More particularly, the zones of FIGS. 19 and 20 are subtracted from the zone shown by b in FIG. 14. This results in a zone 0 shown in FIG. 21. This zone is the grasp zone within which the object can be grasped by the hand.

Figure 21:
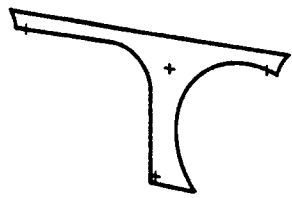

[S27] The program then determines a grasp location for the zone determined at the step S26. There are various techniques for determining the grasp position. Here, one is taken which selects an innermost grasp position (having the longest distance from the periphery of the object) from grasp positions which are arranged into a lattice. Several points spaced apart from the selected grasp position are then selected discretely (FIG. 21).

[S28] Finally, the program determines a range of feasible grasp orientations for the grasp position selected at the step S27.

Figure 22:
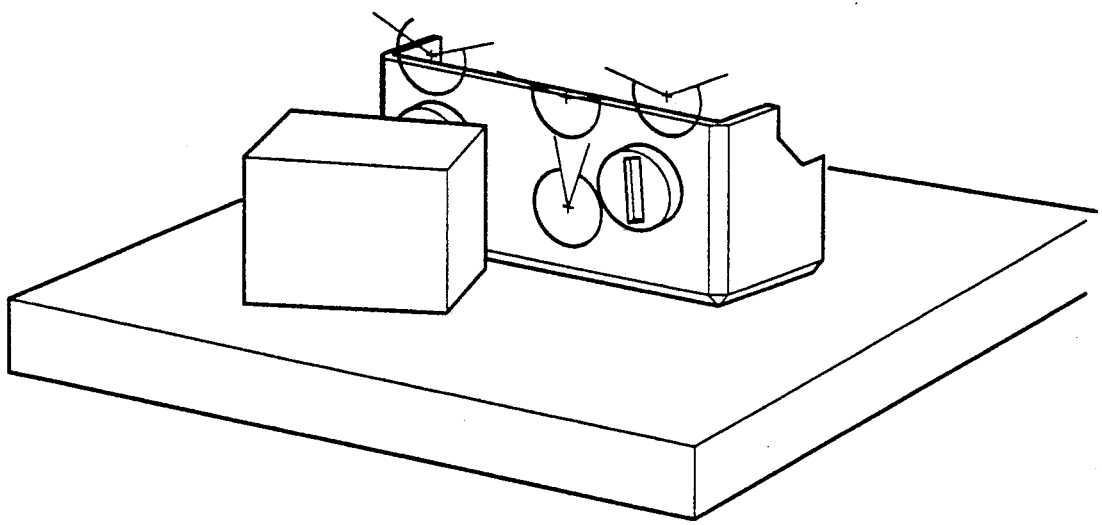

More particularly, the program determines a range in which the hand will not interfere with the object and/or the environment around the object when the hand is fixed to the grasp position at its origin H and rotated through one complete revolution about the y-axis thereof. In other words, the program determines 2d-fingers and 2d-bodies provided by projecting the fingers and body of hand onto the gripping planes, respectively. When the 2d-finger is rotated through one complete revolution about the respective grasp position in the gripping plane, the program determines a range in which the obstacles of the finger do not interfere with the zone projected onto the gripping plane. When the 2d-body is rotated through one complete revolution about the grasp position in the gripping plane, the program also determines a range in which the obstacles of the hand body do not interfere with the zone projected onto the gripping plane. The program determines a product of these ranges from which a range of graspability is determined (FIG. 22). A possible grasp orientation is indicated by an opened sector in each circle.

The steps S21-S23 may be previously determined prior to preparation of a grasp plan since they will not be varied depending on the position and orientation of the object and the obstacles around the object, but can be determined only from the data of the object and hand.

Selection of Open Space Pyramid and Distance Transformation (S12 and S13)

In order to provide an index indicating the easy movement of the hand on grasp against the obstacles around the object, it is important that the program knows the spread of space which is not occupied by any obstacles, as viewed from the hand. The program characterizes the spread of the local space around the grasp position and then analyzes its structure. The space characterization must meet the following requirements:

(1) Information relating to the orientation of the hand should be easily obtained.

(2) In order to provide an index representing the spread for the hand, the program should be characterized by any unit which has a higher degree of coincidence with the space occupied by the hand.

(3) For uniform investigation of the space in all the directions as viewed from the grasp position, the three-dimensional space around the grasp position should be characterized in all directions.

Figure 23:
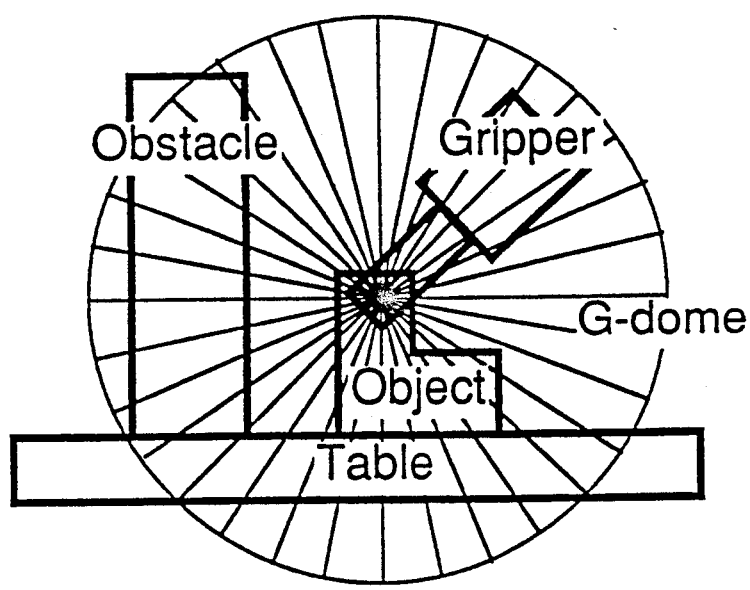
FIG. 23 is a view illustrating a space characterization around a grasp position.

To provide a space characterization meeting these conditions, we propose a technique of dividing the space around the grasp position into uniform triangular pyramids in all directions and characterizing these triangular pyramids, as shown in FIG. 23. The two-parallel-finger type hand is elongated in the Z-axis direction, as seen from FIG. 9. Thus, there is a very high probability that the space occupied by the hand will coincide with a bundle of triangular pyramids in the orientation direction of the hand.

Figure 24:
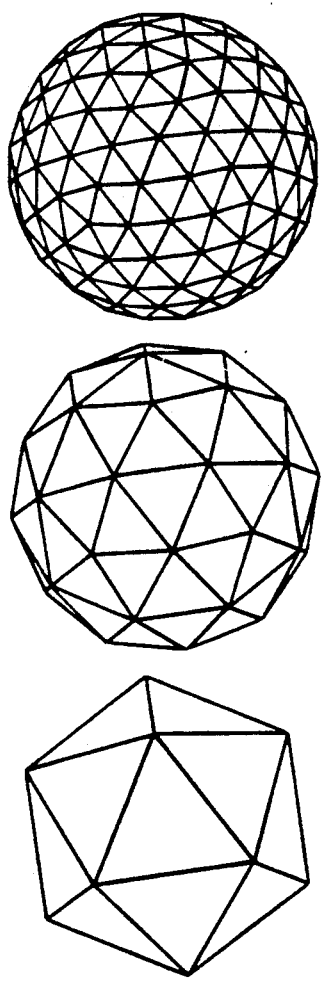
FIG. 24 illustrates several geodesic domes.

This characterization can be easily described by a geodesic dome. The geodesic dome may be generated by subdividing each triangular face of a regular icosahedron into four regular subfaces. By performing the generation of such a geodesic dome about the grasp position, the space is divided into triangular pyramids each of which has its apex located at the grasp position and its bottom face corresponding to one triangular face in the geodesic dome (FIG. 24).

Figure 25:
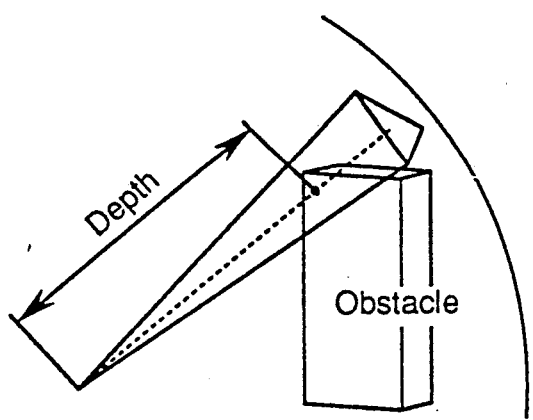
FIG. 25 illustrates a depth value in a space pyramid.

A characterization for the space about the grasp position is then prepared by examining interference of all the triangular pyramids with obstacles around the object, as shown in FIG. 23. The actual calculation is performed for each triangular pyramid such that it determines a distance (depth) between the grasp position and a point at which a half line (central axis) passing through the center of gravity in the bottom face initially intersects any surface of a surrounding substance (FIG. 25). A portion of the triangular pyramid extending from its apex through the above distance (depth) is a space which is not occupied by the substance, such a space being called a "space pyramid" hereinafter. Among such space pyramids, one having a length (depth) equal to or larger than a reference length will be called an "open space pyramid". The reference length is defined herein by the length of the hand × 1.5 such that the hand can exist in the open space pyramid with sufficient room to access to the object.

Figure 26:
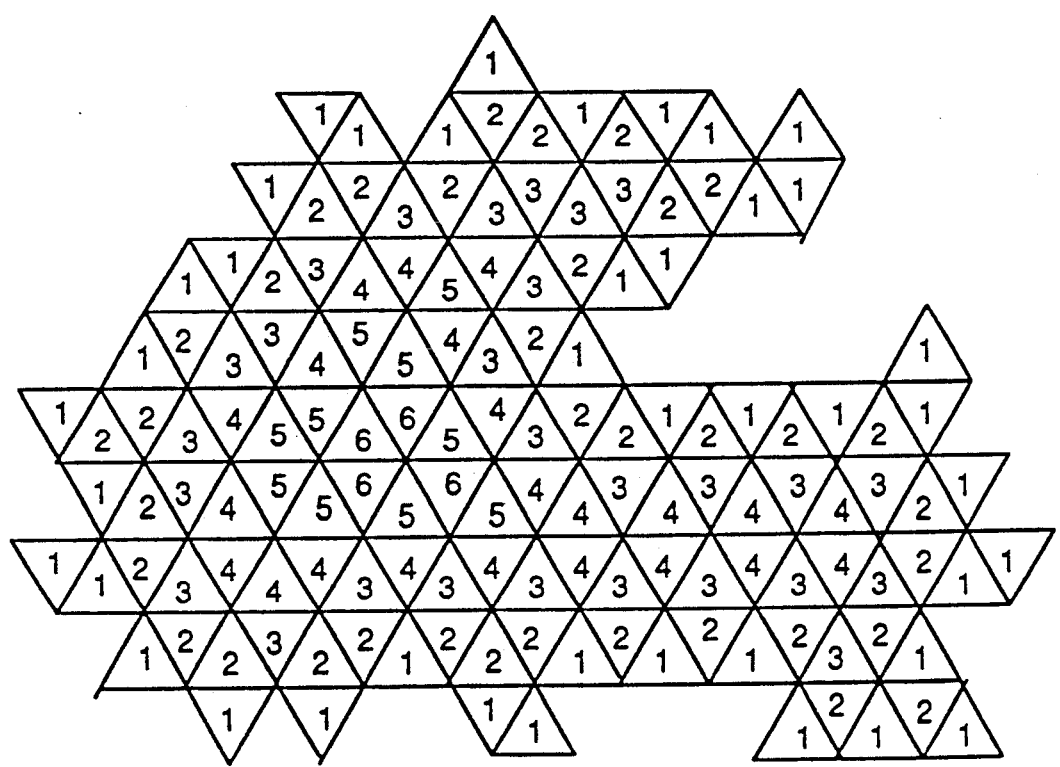
FIG. 26 illustrates a distance transformation.

By investigating the distribution of such open space pyramids, the structure of the space around the grasp position can be known. In other words, the program makes a distance transformation for non-open space pyramid between each pair of adjacent open space pyramids on the surface of a geodesic dome. In such a manner, the distance between each of the open space pyramids and a non-open space pyramid nearest to that open space pyramid can be determined (FIG. 26).

Figure 27:
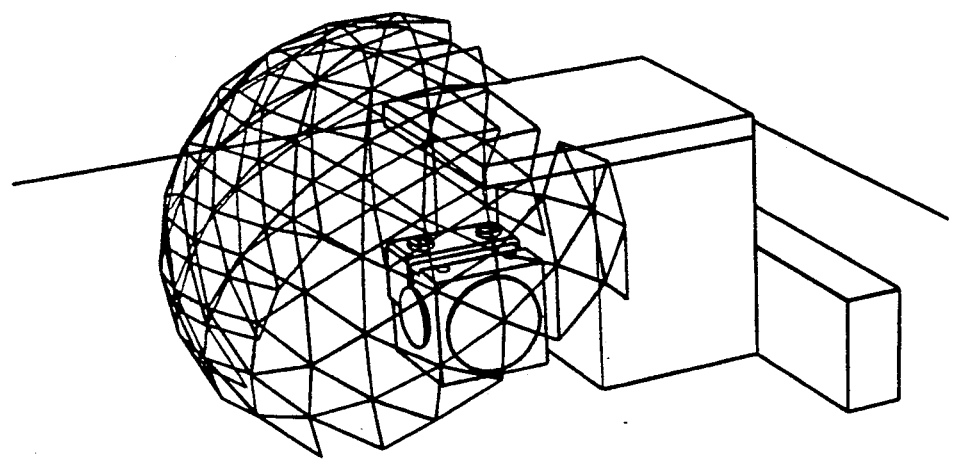
FIGS. 27 and 28 illustrate examples of open space pyramids.
Figure 28:
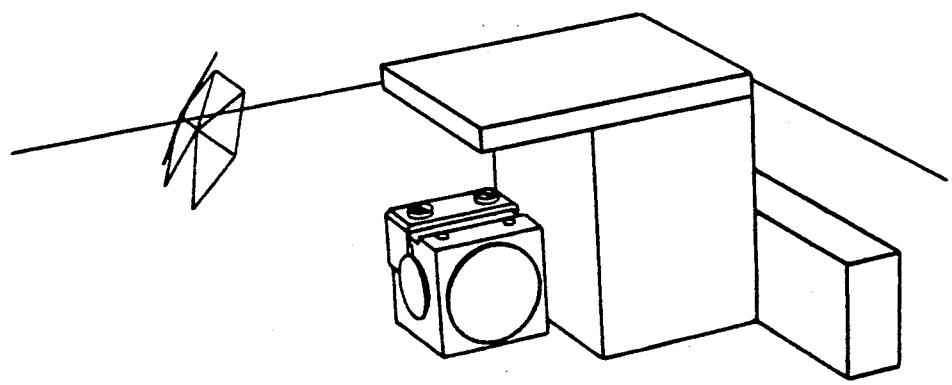

Although the open space pyramids are generally distributed in the form of a bundle, an open space pyramid having the maximum distance value becomes the center of a bundle of open space pyramids which is locally thickest. Thus, this indicates a direction in which the widest open space exists and means that the hand can be easily moved without interference with obstacles around the hand. A bundle of open space pyramids is exemplified in FIG. 27 while among them, an open space pyramid having the maximum distance value is shown in FIG. 28.

Selection of Pick-and-Place Grasp Candidate (S14)

Figure 29:
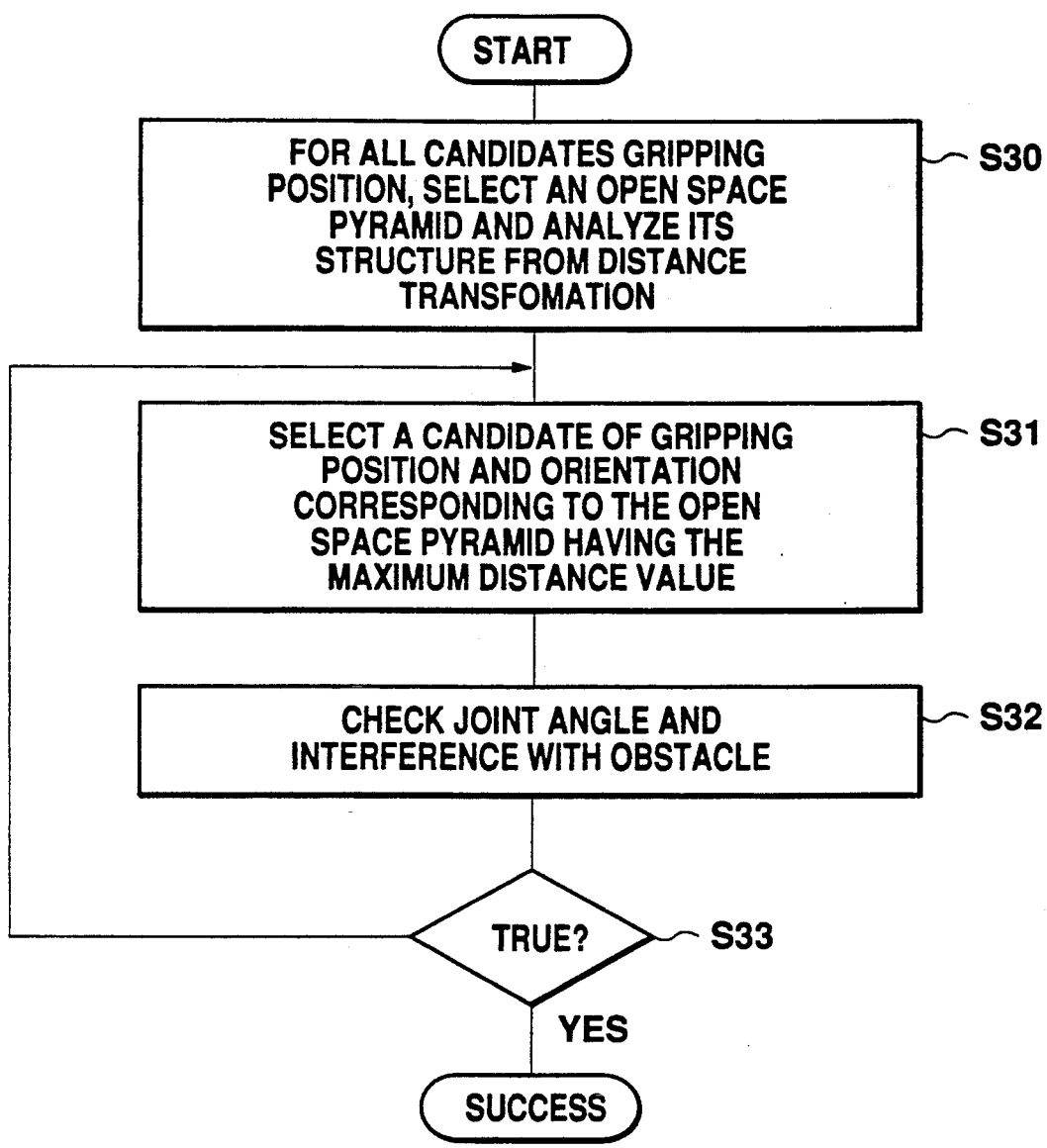
FIG. 29 is a flow chart illustrating an operation for selecting grasp position and orientation.

The program analyzes the structure of the space around each of the grasp position candidates and selects from these a grasp candidate in which the hand can move most easily. The motion of the hand may be affected even by the movable range of each joint and the interference of the arm with obstacles. In order to make a path plan easy, it is also important that there is room for each of the joints to be moved and that a portion of the arm other than the hand can be freely moved in all the directions without interference with the surrounding environment. In consideration of these matters, the program selects an appropriate grasp orientation candidate, as shown in FIG. 29.

[S30] First of all, obstacles around the object on picking and placing are superimposed on the coordinate system of the object to prepare and analyze the space characterization around each of all the grasp position candidates in the model of the environment.

[S31] Next, the program selects open space pyramids in each of which the position of its apex and the direction of its central axis correspond to the position and orientation of the respective one of the grasp position candidates. From the selected open space pyramids, the program further selects a grasp position and orientation candidate which corresponds to the position and orientation of an open space pyramid having the maximum distance transformation value.

[S32] The program checks whether or not the grasp orientation candidate selected at the step S31 has room for each of the joints and whether or not there is any interference of the arm with obstacles near the grasp orientation candidate.

[S33] Finally, it is judged that the process is successful if the step S32 is true. If the step S32 is false, the program goes back to the step S31 wherein the program initiates the selection the next candidate. The next candidate must be one that has a grasp position spaced apart from the previously selected candidate(s) by a given distance or a grasp orientation spaced apart from the previous candidate(s) by a given angle.

Utilization of Rotational Symmetry

Figure 30:
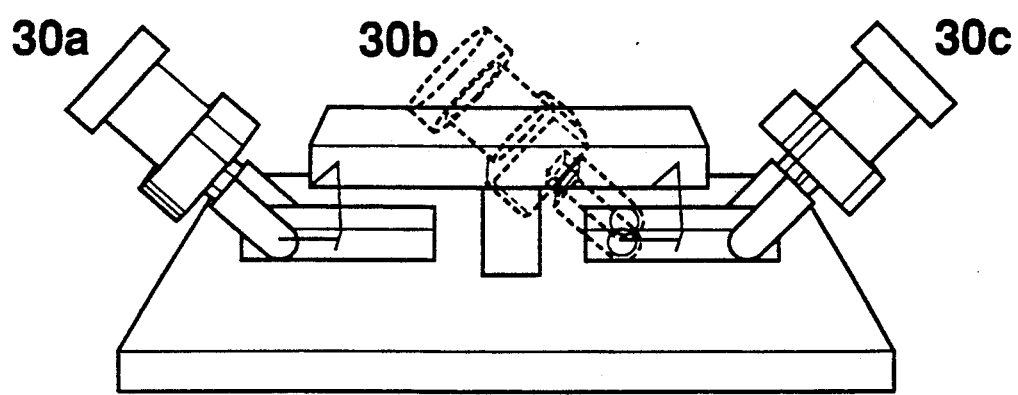
FIG. 30 is a view illustrating a problem created when an object having a rotational symmetry is regrasped by the hand.
Figure 31A:
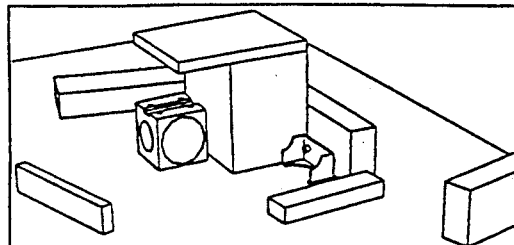
FIG. 31 is a view illustrating a regrasping operation plan.
Figure 31E:
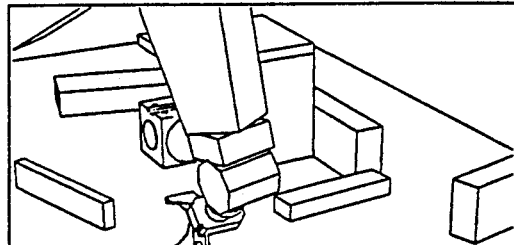
Figure 31B:
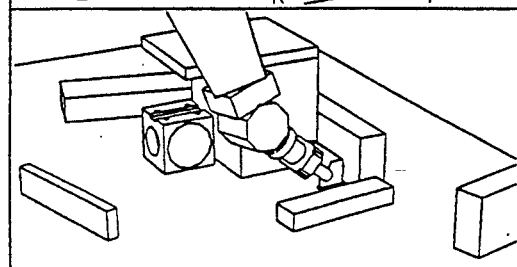
Figure 31F:
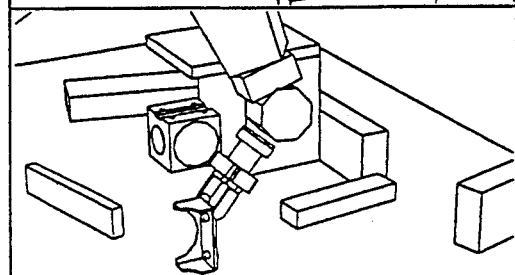
Figure 31C:
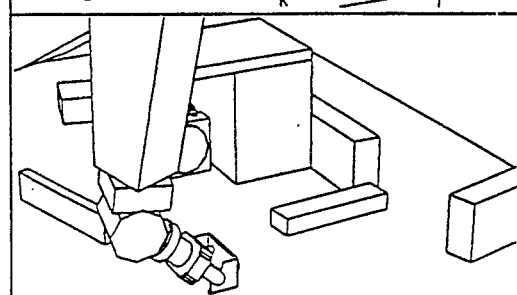
Figure 31G:
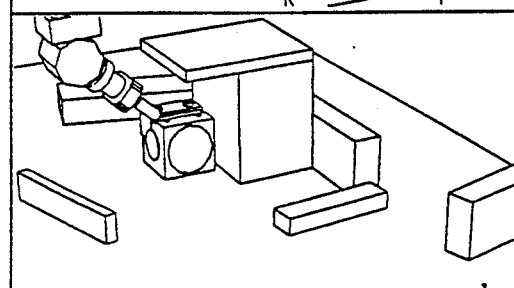
Figure 31D:
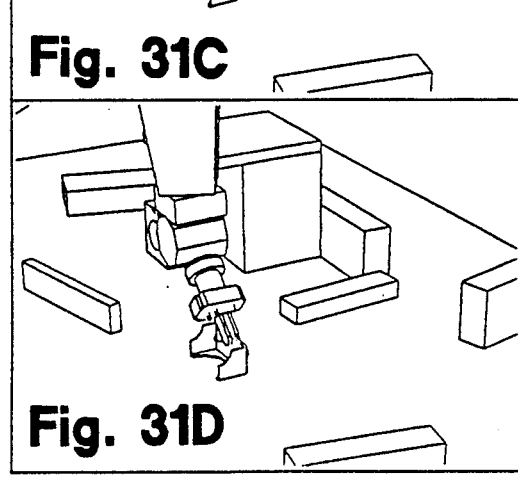
Figure 31H:
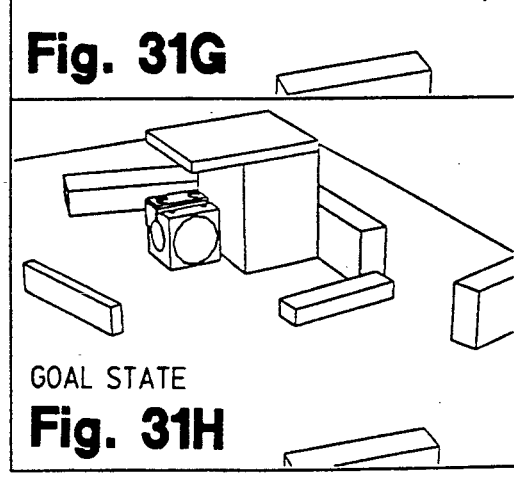

The techniques described up to now can be applied to many polyhedral objects, but raise a problem when they are applied to an object having rotational symmetry. In the pick-and-place grasp plan shown in FIG. 30, for example, grasp position and orientation on picking up (30a) will be shifted to grasp position and orientation on placing (30b). This becomes a failure since the hand interferes with obstacles in the grasp position and orientation on placing (30b). Thus, the object must be regrasped by the hand. Actually, however, the grasp operation can be realized by a single pick-and-place operation since the rotational symmetry of the object permits the hand to pick the object in the position and orientation (30a) and to place the object on the table in the position and orientation (30c). With an object having rotational symmetry, it is not necessary to consider a plurality of possible positions and orientations on placing with reference to the position and orientation of the hand when it picks up the object.

By utilizing a rotation transformation matrix (rotational symmetry matrix) about the origin of the object such that its configuration will not vary even in transformation, the program determines a plurality of grasp position and orientation sets for placement which correspond to the grasp position and orientation sets on picking up. The pick-and-place grasp plan thus prepared can minimize the number of regrasps even if an object having rotational symmetry is to be handled. More particularly, the program determines a rotational symmetry matrix for each object and uses the determined rotational symmetry matrix to determine correspondences to the zones obtained at the steps S24 (pick) and S25 (place). For each correspondence, the program performs a portion of the process including and later than the step S26.

If a regrasp is required, any duplication in the process can be avoided by utilizing the rotational symmetry such that a plurality of regrasp states in state-space-search which appear to be the same will not be repeated.

Example-of Operation

Using the technique of the present invention, a regrasp operation plan was made when an object as shown in FIG. 4 was placed as shown in FIG. 31-1 and assembled onto another part as shown in FIG. 31-8.

In this example, the object must be regrasped twice. The object was moved from a first state shown in FIGS. 31-1 and 31-2 through a second state shown in FIGS. 31-3 and 31-4 and a third state shown in FIGS. 31-5 and 31-6 to the final state shown in FIGS. 31-7 and 31-8.

In accordance with the plan prepared by the system of the present invention, three pick-and-place operations were planned as shown in FIGS. 31-2 and 31-3; 31-4 and 31-5; and 31-6 and 31-7. These grasps have their position and orientation in which the hand can be easily moved around. It is well understood particularly from FIG. 31-7 that the grasp is carried out avoiding the obstacles near the grasp position.

It is also understood from FIGS. 31-3, 4, 5 and 6 that the regrasp locations are performed in widely opened places on the table without any obstacles.

We claim:

1. A robot operation planning system for planning the object grasping operation of a robot from a three-dimensional model of the environment including an initial state of an object to be grasped and the state of surrounding matter, said robot having a grasping portion including a hand, said system comprising:

(A) grasp candidate calculating means for calculating candidates for a grasping position and orientation at which an object can be grasped at a given grasp position, at least based on geometric data of said object and the grasping portion of a robot;

(B) open space pyramid selecting means for dividing the space around each grasp position into space pyramids of a predetermined magnitude each having an apex corresponding to the grasp position and for selecting space pyramids having no interference with surrounding obstacles from said divided space pyramids, said selected space pyramids defining open space pyramids;

(C) distance transforming means for determining the distance between each of the selected open space pyramids and a non-open space pyramid which is a space pyramid interfering with the surrounding matter;

(D) grasp selecting means for determining the grasp position and orientation of the robot hand, at least based on both the distance of the open space pyramids determined by said distance transforming means and the grasp candidates calculated by said grasp candidate calculating means; and (E) means for moving the hand to the grasp position and orientation determined by the grasp selecting means.

2. A robot operation planning system as defined in clam 1 wherein said grasp selecting means selects one of the grasp candidates which has a maximum distance value.

3. A robot operation planning system as defined in claim 2 wherein said grasp candidate calculating means recognizes, during consideration of the rotational symmetry of the object, that a plurality of grasps from each pair of opposite directions in the rotational symmetry are the same grasp candidate.

4. A robot operation planning system as defined in claim 1 wherein said grasp candidate calculating means calculates a grasp candidate which can pick and place the object on the table, based on geometric data of the initial state and a goal state of the object, the surrounding environment at the initial and goal states and the hand of the robot.

5. A robot operation planning system as defined in claim 4 wherein said grasp candidate calculating means determines a zone in which the object can be grasped by the robot hand at the initial state and a goal state by setting a gripping plane formed by the robot hand and the object and by projecting obstacles of the hand onto the gripping plane.

6. A robot operation planning system as defined in claim 5 wherein the robot hand includes two fingers, each finger having an area adapted to make contact with the object, the area having a predetermined size, whereby the zone in which the object can be grasped is an amount corresponding to the size of the area.

* * * * *